(No Model.)
P. J. & W. J. O'BRIEN.
INCASEMENT FOR AIR HEATERS.
No. 358,065. Patented Feb. 22, 1887.
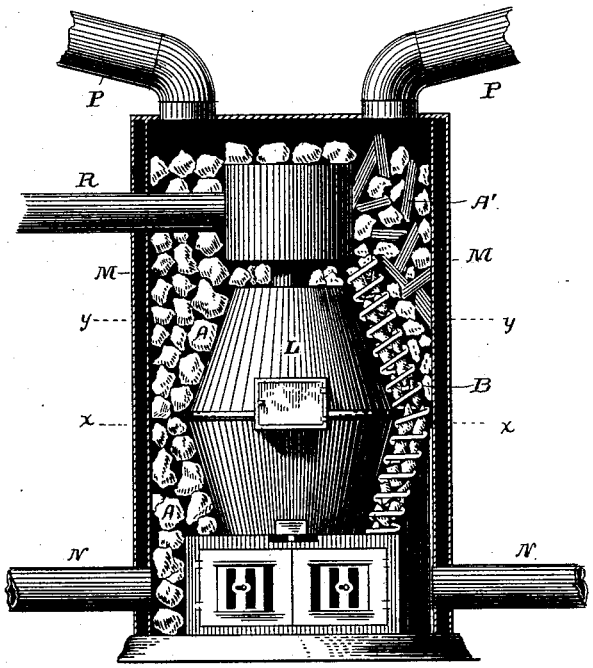
Fig. 1.
Fig. 3.
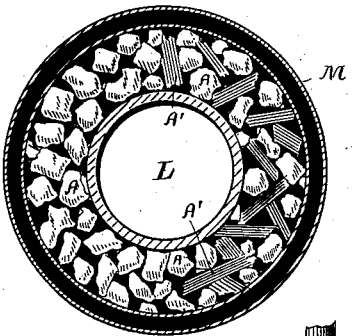
Fig. 2.
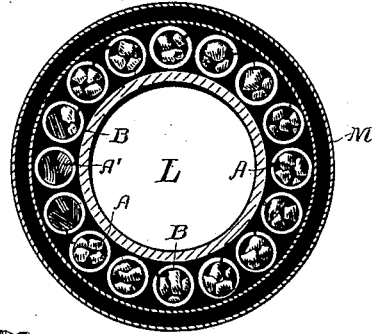
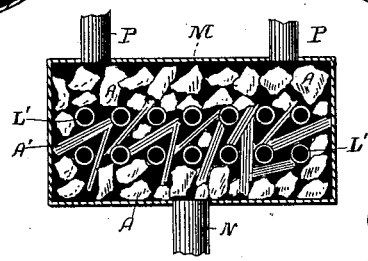
Fig. 4.
Witnesses:
H. F. Dodd
H. Schaffer
Inventors.
Philip J. O'Brien,
William J. O'Brien,
by A. B. Upham,
Their Attorney.

UNITED STATES PATENT OFFICE.

PHILIP J. O'BRIEN AND WILLIAM J. O'BRIEN, OF PEORIA, ILLINOIS.

INCASEMENT FOR AIR-HEATERS.

SPECIFICATION forming part of Letters Patent No. 358,065, dated February 22, 1887.

Application filed March 19, 1886. Serial No. 195,785. (No model.)

*To all whom it may concern:*

Be it known that we, PHILIP J. O'BRIEN and WILLIAM J. O'BRIEN, both of Peoria, in the county of Peoria, in the State of Illinois, have invented an Improved Incasement for Air-Heaters; and we do hereby declare that the following is a full, clear, and exact description thereof, reference being had to the annexed drawings, making a part of this specification, in which like letters of reference refer to like parts, and in which—

Figure 1 represents a central vertical section of the casing of a furnace; Fig. 2, a horizontal section of the furnace at X X in Fig. 1; Fig. 3, a horizontal section of same at Y Y in Fig. 1; Fig. 4, a cross-section of incased steam-pipes arranged for indirect heating.

This invention is in the line of apparatus for heating air preparatory to its admission to an apartment which is wished to be warmed thereby, and the results which we desire to accomplish are, in the main, to better enable the warmth to be communicated from the heat-center to the air passing between the same and an enveloping-case, and, second, to equalize the heating ability of the same. To do this we fill the space between the fire-pot—in the case of a furnace—and its air-confining envelope with roughly-broken stone or scrap sheet metal, or both, held in our pervious confining-jackets. There being sufficient room between the stones or scrap metal for the upward passage of the air, the latter is still detained enough to impart to it the heat communicated to the stones from the fire-pot.

In the drawings, L represents the fire-pot of a furnace, M the enveloping-casing, N the cold-air flues, P the hot-air pipes, and R the smoke-pipe.

In Fig. 3 and at the left-hand side of Fig. 1, A A, &c., represent the broken stones loosely filling the space between the fire-pot L and the casing M, and A' represents the scrap sheet metal for the same purpose. This scrap metal and the stones or brickbats resting against the fire-pot L extract rapidly therefrom the heat, which is transmitted to the remainder of the rock, and from them to the air circulating between them. As the air becomes warmed it rises up through the irregular interstices, deriving more heat from the many faces and points of stone, until it reaches the top of the furnace and passes therefrom through the pipes P to the apartments to be heated.

Among many other great advantages derived from this incasement consisting of broken stone and scrap metal are the facts that the same subtracts the heat from the fire-pot with such rapidity as to prevent the latter from becoming too highly heated, and also that the warmth can be communicated more readily from the subdivided surfaces of the stones. By thus keeping the fire-pot from becoming red-hot the injurious gases of combustion, which otherwise pass freely through the metal, are prevented from commingling with the air that is being warmed. The dust and gases which come in through the cold-air flues are absorbed or impeded by their contact with the surfaces of the broken stone, and so the apartments warmed by the furnace are freed from such impurities.

Instead of throwing the broken stone promiscuously into the air-space of the furnace, we provide the pervious confining-jackets, consisting preferably of the spiral coils of wire B, which are secured to the sides of the fire-pot, as in Figs. 1 and 2, and filled with the stone fragments or scrap metal. These wire coils may be secured to the fire-pot either vertically or horizontally, and held thereto by binding-wires or by broken stone inserted between them and the casing M. By means of these coils the broken stone and scrap metal are kept from packing too tightly together and choking up considerable of the necessary air-channels, as might occur if the furnace were put together by inexperienced hands.

Another mode of indirect heating is by means of steam-pipes provided with an enveloping-case, and air-supply and air-exit to the room to be warmed. The broken stone and scrap metal inserted into this case among the steam-pipes serve the same purpose as in the furnace just described.

Fig. 4 shows such a steam indirect heater, in which M is the casing, L' the steam-pipes, N the air-supply pipe, and P the hot-air exit. The broken stone A and scrap metal A', placed in the case about the steam-pipes L', subtract the heat therefrom and transmit it to the air circulating through their interstices, as before described.

This incasement is not only of advantage for the reasons previously described, but also on account of its governing power. When the heat-center gets unusually hot, the broken stones absorb the caloric and give it out to the air, when the said center cools down, thus equalizing the temperature of the air supplied to the rooms.

What we claim as our invention, and for which we desire Letters Patent, is as follows, to wit:

1. The combination, with the heat-center and the enveloping-case, of the spiral coils of wire B and the broken stone inserted therein, substantially as and for the purpose set forth.

2. The combination, with the fire-pot L and the casing M, of the spiral coils of wire B, secured about said fire-pot, and the broken stone and scrap metal inserted in and about said coils, as and for the purpose specified.

In testimony that we claim the foregoing invention we have hereunto set our hands this 16th day of March, 1886.

PHILIP J. O'BRIEN.
WILLIAM J. O'BRIEN.

Witnesses:
A. B. UPHAM,
C. N. MIHIGAN.